United States Patent
Plichta et al.

(10) Patent No.: US 10,225,259 B2
(45) Date of Patent: Mar. 5, 2019

(54) ESTABLISHING A CLEANROOM DATA PROCESSING ENVIRONMENT

(71) Applicant: Oracle International Corporation, Redwood Shores, CA (US)

(72) Inventors: Jeremy Ryszard Plichta, Arvada, CO (US); Andrew V Baird, Broomfield, CO (US); Roger Siggs, Broomfield, CO (US); Kevin Scott DiMichel, Golden, CO (US); Robert J Cuthbertson, Lafayette, CO (US); David Michael Mitchell, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 15/242,292

(22) Filed: Aug. 19, 2016

(65) Prior Publication Data
US 2017/0289169 A1  Oct. 5, 2017

Related U.S. Application Data

(60) Provisional application No. 62/315,557, filed on Mar. 30, 2016.

(51) Int. Cl.
*G06F 21/62* (2013.01)
*H04L 29/06* (2006.01)

(52) U.S. Cl.
CPC ........ *H04L 63/102* (2013.01); *G06F 21/6218* (2013.01); *G06F 21/6245* (2013.01); *H04L 63/0272* (2013.01); *H04L 63/04* (2013.01); *H04L 63/08* (2013.01); *H04L 63/083* (2013.01); *H04L 63/0853* (2013.01); *H04L 63/20* (2013.01); *H04L 63/308* (2013.01)

(58) Field of Classification Search
CPC ... H04L 63/102; H04L 63/0272; H04L 63/04; H04L 63/08; H04L 63/083; H04L 63/0853; H04L 63/20; H04L 63/308; G06F 21/6218; G06F 21/6245
See application file for complete search history.

(56) References Cited

U.S. PATENT DOCUMENTS 8,769,622 B2  7/2014  Chang et al.
8,799,997 B2  8/2014  Spiers et al.
(Continued)

*Primary Examiner* — Joseph P Hirl
*Assistant Examiner* — Stephen T Gundry
(74) *Attorney, Agent, or Firm* — Invoke

(57) ABSTRACT

Techniques for providing a virtual cleanroom data processing environment are described herein. In one or more embodiments, a virtual private cloud environment is configured to prevent data from being sent to network locations external to the virtual private cloud environment. One or more computing resources deployed within the virtual private cloud environment receives, from a first source external to the virtual private cloud environment, a first set of data that is associated with a first user account. A set of one or more software components, received from a second source, are also deployed within the virtual private cloud environment. Once deployed, the set of software components generates, based at least in part on the first set of data, a set of output data. The first set of data is continuously prevented from being sent to network locations external to the virtual private cloud environment.

20 Claims, 6 Drawing Sheets

(56) References Cited

U.S. PATENT DOCUMENTS

| | | | | |
|---|---|---|---|---|
| 8,813,225 | B1* | 8/2014 | Fuller | H04L 63/10 726/23 |
| 8,869,235 | B2* | 10/2014 | Qureshi | G06F 21/10 726/1 |
| 8,910,278 | B2 | 12/2014 | Davne et al. | |
| 8,914,406 | B1* | 12/2014 | Haugsnes | H04L 63/1441 707/769 |
| 8,984,610 | B2 | 3/2015 | Spiers et al. | |
| 8,984,651 | B1* | 3/2015 | Miller | H04L 63/20 726/26 |
| 9,098,687 | B2 | 8/2015 | Hayton | |
| 9,148,414 | B1* | 9/2015 | Roth | H04L 63/08 |
| 9,209,979 | B2 | 12/2015 | Spiers et al. | |
| 9,471,775 | B1* | 10/2016 | Wagner | G06F 9/45533 |
| 9,485,234 | B1* | 11/2016 | Roth | H04L 63/20 |
| 9,584,439 | B2* | 2/2017 | Leafe | G06F 9/44526 |
| 9,608,809 | B1* | 3/2017 | Ghetti | H04L 9/083 |
| 9,613,190 | B2* | 4/2017 | Ford | G06F 21/10 |
| 9,628,448 | B2 | 4/2017 | Hayton | |
| 9,749,331 | B1* | 8/2017 | Koeten | H04L 63/102 |
| 9,762,553 | B2* | 9/2017 | Ford | G06F 21/10 |
| 9,847,994 | B1* | 12/2017 | Kelly | H04L 67/06 |
| 9,866,545 | B2* | 1/2018 | Beecham | H04L 63/08 |
| 9,942,265 | B2* | 4/2018 | Holden | H04L 63/1458 |
| 2004/0123153 | A1* | 6/2004 | Wright | G06F 21/32 726/1 |
| 2009/0183257 | A1* | 7/2009 | Prahalad | G06F 21/6218 726/22 |
| 2009/0249440 | A1* | 10/2009 | Platt | H04L 63/0815 726/1 |
| 2011/0022812 | A1* | 1/2011 | van der Linden | G06F 9/5077 711/163 |
| 2011/0314530 | A1* | 12/2011 | Donaldson | G06F 21/83 726/7 |
| 2012/0072985 | A1* | 3/2012 | Davne | H04L 63/0272 726/22 |
| 2012/0246740 | A1* | 9/2012 | Brooker | G06F 21/121 726/28 |
| 2013/0110993 | A1 | 5/2013 | Liu et al. | |
| 2013/0205028 | A1* | 8/2013 | Crockett | G06F 9/5027 709/226 |
| 2013/0219176 | A1* | 8/2013 | Akella | H04L 63/0815 713/165 |
| 2013/0247034 | A1* | 9/2013 | Messerli | G06F 9/45533 718/1 |
| 2014/0032691 | A1 | 1/2014 | Barton et al. | |
| 2014/0032759 | A1* | 1/2014 | Barton | H04L 67/10 709/225 |
| 2014/0040979 | A1* | 2/2014 | Barton | H04L 63/20 726/1 |
| 2014/0059226 | A1* | 2/2014 | Messerli | G06F 9/5072 709/226 |
| 2014/0075568 | A1* | 3/2014 | Sathyadevan | G06F 21/554 726/27 |
| 2014/0082749 | A1 | 3/2014 | Holland et al. | |
| 2014/0108792 | A1* | 4/2014 | Borzycki | G06F 21/6218 713/165 |
| 2014/0230044 | A1 | 8/2014 | Liu et al. | |
| 2014/0280740 | A1* | 9/2014 | Alley | H04L 29/08072 709/219 |
| 2016/0044040 | A1* | 2/2016 | Caffary, Jr. | G06F 21/6218 726/4 |
| 2016/0112453 | A1* | 4/2016 | Martinez | G06F 9/455 726/1 |
| 2016/0203528 | A1 | 7/2016 | Saha et al. | |
| 2017/0134423 | A1 | 5/2017 | Sysman et al. | |
| 2018/0150475 | A1 | 5/2018 | Hrebicek et al. | |

\* cited by examiner

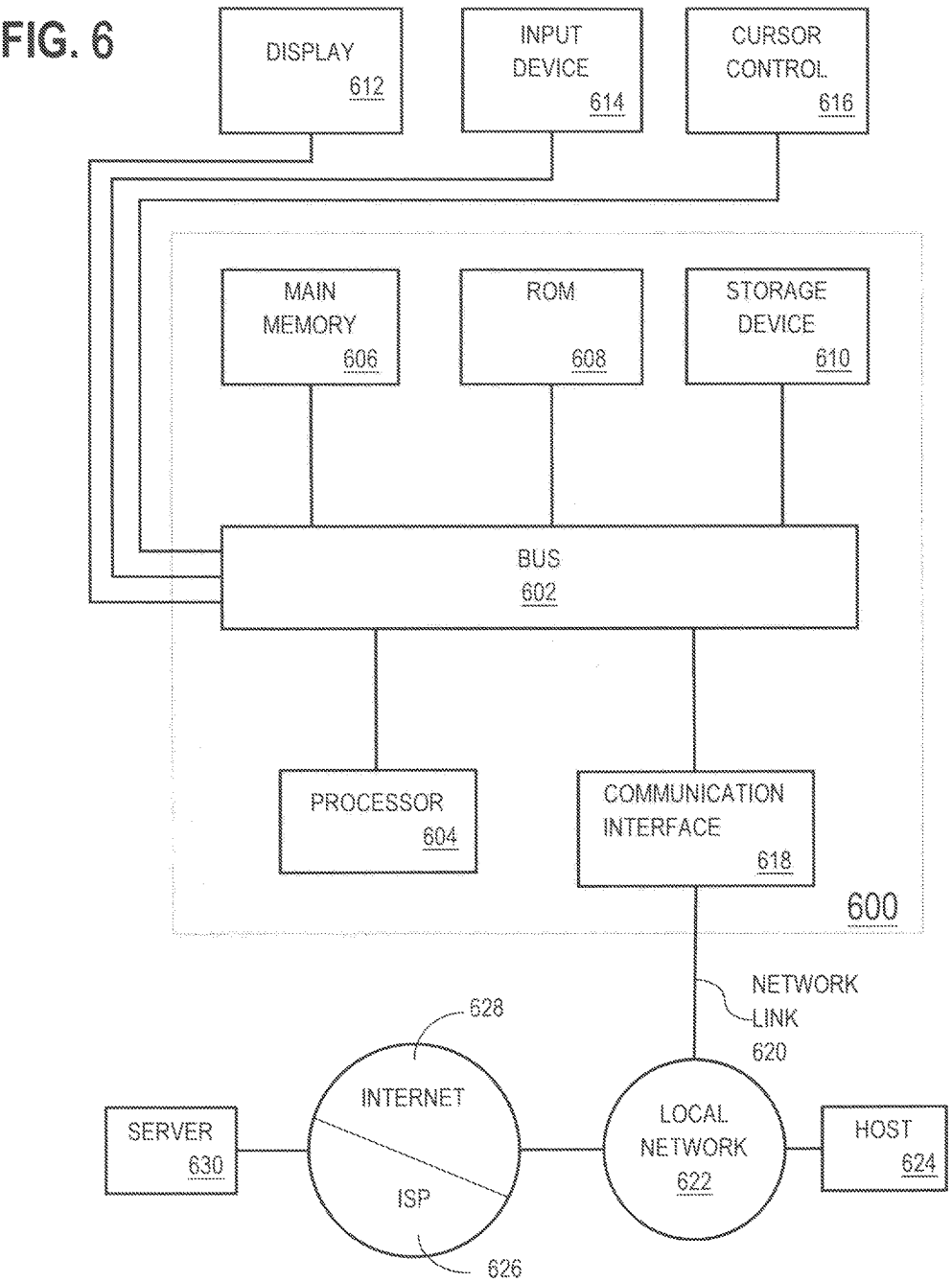

ESTABLISHING A CLEANROOM DATA PROCESSING ENVIRONMENT

RELATED CASES; BENEFIT CLAIM

This application claims the benefit of U.S. Provisional Patent Appl. No. 62/315,557, entitled "CLEANROOM DATA PROCESSING ENVIRONMENT", filed Mar. 30, 2016, the entire contents of which are incorporated by reference as if set forth in their entirety.

This application is related to U.S. patent application Ser. No. 15/242,284, entitled "ENFORCING DATA SECURITY IN A CLEANROOM DATA PROCESSING ENVIRONMENT", filed Aug. 19, 2016, the entire contents of which are incorporated by reference as if set forth in their entirety.

TECHNICAL FIELD

The present disclosure relates, generally, to data security and, more specifically, to systems and methods for preventing unauthorized access to data within a data processing environment in which data is combined from multiple sources.

BACKGROUND

Organizations and other entities are often unable to share data with other parties due to privacy and/or contractual requirements. However, the organization may wish to combine the sensitive data with data from another party in order to gain insight that would be difficult to glean from the sensitive data in isolation. As an example, a first organization may collect consumer information where strict privacy requirements govern human access to the data. A second organization may control an analytic tool that would be useful to run on the consumer information. However, the first organization may be reluctant to use the analytic tool due to the risk of unauthorized human access to the consumer information by a human user within the second organization. The first organization may instead choose to forego use of the analytic tool, potentially missing out on valuable insights into the consumer information in order to comply with the privacy and/or contractual requirements associated with the data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments

DETAILED DESCRIPTION

Figure 1:
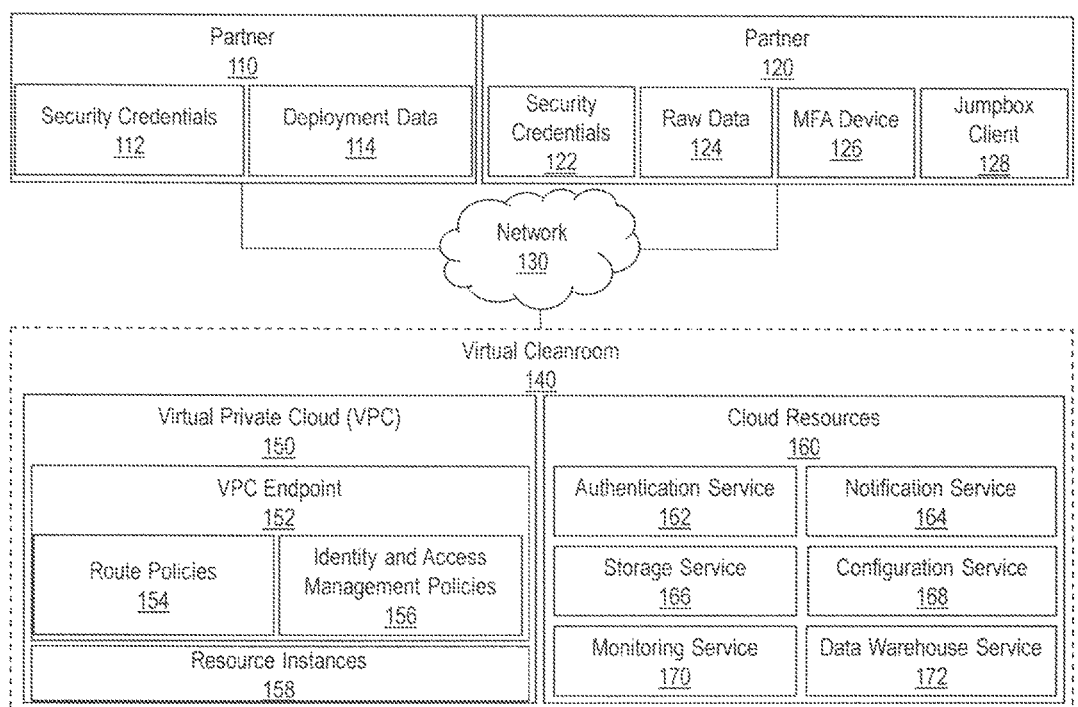
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. VIRTUAL CLEANROOM SETUP
4. ACCESS CONTROL AND PREVENTION
5. SHARED MULTI-FACTOR AUTHENTICATION
6. VIRTUAL CLEANROOM MONITORING
7. KILL SWITCH PROTECTION
8. HARDWARE OVERVIEW
9. MISCELLANEOUS; EXTENSIONS

1. General Overview

Techniques for establishing and protecting a virtual cleanroom data processing environment are described herein. A virtual cleanroom data processing environment, as used herein, comprises a virtual private cloud through which a logically isolated set of computing resources are provisioned. Sensitive data that is loaded into the virtual cleanroom may be prevented from being exported to network locations external to the cleanroom. In addition, visibility of the data within the virtual cleanroom is strictly monitored and, for some data, may be prevented altogether. The virtual cleanroom allows partners to run analytics on sensitive datasets, including data subject to strict privacy and/or contractual requirements, without either partner having access or visibility to the sensitive data.

In one or more embodiments, the virtual cleanroom is established by configuring a virtual private cloud environment to prevent data from being sent to network locations external to the virtual private cloud environment. Once configured, the virtual private cloud environment allows deployed software to execute analytics on data supplied by one or more parties without any party having access or visibility to that data. As an example, the virtual private cloud environment may receive a set of sensitive data from a first user account with security credentials that grant permission to load data into the environment. The virtual private cloud environment may also receive a set of software components from a second user account with security credentials to load data into the environment. The set of software components may then be used to generate an analytic output based, at least in part on the sensitive data provided through the first user account. While the sensitive data is stored in the virtual private cloud environment, data security measures are enforced to continuously prevent the sensitive data that is associated with the first user account from being sent to network locations external to the virtual private cloud environment.

In one or more embodiments, the security measures that are enforced continuously prevent software components deployed within the virtual private cloud environment from accessing any resource sufficient to send sensitive data outside of the virtual private cloud environment without prior approval of at least the first user account. For example, the software components may be prevented from having direct access to network locations outside of the virtual private cloud environment. All data to and from the virtual private cloud may be routed through a virtual private cloud endpoint, which may deny or otherwise prevent requests by the software components to access resources external to the virtual private cloud environment.

In one or more embodiments, a kill switch is implemented that allows multiple user accounts to destroy the virtual private cloud environment. The kill switch provides an extra layer of protection to sensitive data that is loaded into the virtual private cloud environment. As an example, multiple user accounts may provide sensitive data to a virtual private cloud environment, including a first user account associated with a first set of one or more security credentials and a second account associated with a second set of one or more security credentials. If a data breach is detected or suspected, then the first user account or the second user account may issue a request to destroy the virtual private cloud environment using the associated security credentials. In response to receiving the request, the virtual private cloud environment is destroyed, which includes deleting the sensitive data loaded into the virtual private account by the first user account and the second user account. Thus, if the security of the virtual private cloud environment has been compromised in any way, the kill switch allows the partner to eliminate or mitigate the impact of a potential breach.

2. Architectural Overview

FIG. 1 illustrates a system in accordance with one or more embodiments. The system comprises partner 110, partner 120, network 130, and virtual cleanroom 140.

Partners 110 and 120 correspond to different accounts or networks for users that have agreed to share data with virtual cleanroom 140. Partner 110 shares deployment data 114, which may be used to deploy one or more software components within virtual cleanroom 140. A software component in this context may comprise any data that is used to install and/or run one or more instances of an application on a host device or set of host devices. Example software components may include, without limitation, source code, intermediate representations, executables, configuration files, and/or other software files. Partner 120 shares raw data 124, which may be accessed by one or more software resources deployed within virtual cleanroom 140 as described in further detail below. Raw data 124 may correspond to any data that partner 120 would like to analyze, transform, and/or otherwise process using the software deployed within virtual cleanroom 140 but that partner 120 would like to prevent external human users, such as those associated with partner 110, from accessing. In one or more embodiments, partner 110 may also supply its own raw data to be combined with raw data 124. This allows the analysis to be performed on a combined dataset provided by the partners.

In order to access virtual cleanroom 140, partner 110 has security credentials 112, and partner 120 has security credentials 122. Security credentials 112 and 122 may provide varying levels of access to resources within virtual cleanroom 140. For instance, a set of security credentials may allow a partner to read data from a specific storage bucket, write data to a specific storage bucket, invoke a particular service, update a particular setting or policy, or otherwise allow for a specific set of access privileges to a subset of one or more resources within virtual cleanroom 140. The set of security credentials that are registered with a particular partner may vary from implementation to implementation and between different resources. Example security credentials may include, without limitation, username/password credentials, authentication codes, access keys, digital certificates, and/or any other authentication token.

In one or more embodiments, partner 120 has access to multi-factor authentication (MFA) device 126. MFA device 126 may be used when permission to access a resource is restricted unless approval from both partner 110 and 120 is obtained as described in further detail below. MFA device 126 may be a hardware device that is dedicated in whole or in part to generating an authentication factor or may be a virtual device executing on a host machine. In other words, MFA device 126 may generate a hardware token and/or a software token, depending on the particular implementation.

Jumpbox client 128 corresponds to a special-purpose computer or software executing on a network host that is used to access data within virtual cleanroom 140. Jumpbox client 128 includes logic for connecting to a jump server that executed within VPC 150 and may be used to perform limited human access into VPC 150 as described in further detail below. In one or more embodiments, partner 120 has physical control over a machine on which jumpbox client 128 executes. Jumpbox client 128 may execute on MFA device 126 or on a different device depending on the particular.

Network 130 comprises one or more data communication networks through which partner 110 and 120 may communicate with resources within virtual cleanroom 140. In one or more embodiments, network 130 corresponds to the Internet, and partners 110 and 120 communicate with components of virtual cleanroom 140 using communication protocols of the Internet Protocol (IP) suite. In the context where partner 110 and 120 represent different organizations, for example, partner 110 may have access to a first set of host machines in an enterprise network that is associated with the corresponding organization. Similarly, partner 120 may have access to a separate set of host machines deployed within their own network. A host machine in this context may refer to a server, workstation, desktop, laptop, tablet, smartphone, and/or other computing devices that implement one or more communication protocols of the IP suite. Using a host machine and a set of security credentials, partner 120 may access permitted resources within virtual cleanroom 140, for example by submitting requests according to the hypertext transfer protocol secure (HTTPS) or other protocol.

Virtual cleanroom 140 represents a virtual private cloud environment that has strict controls on human accesses into the environment. Virtual cleanroom 140 comprises virtual private cloud (VPC) 150 and cloud resources 160. VPC 150 is a logically isolated set of resources that are provisioned either fully or partially from a public cloud environment such as an Infrastructure-as-a-Service (IaaS), Platform-as-a-Service (PaaS), or other cloud deployment model. In order to isolate the set of resources, VPC 150 may define one or more private subnets in which resource instances 158 are deployed. Resource instances 158 may be provided with private address in accordance with the private subnet to which they are assigned. With private addresses, resource instances 158 may be prevented from having direct access to the Internet. In other words, resource instances 158 are not directly addressable from the Internet and may be restricted from sending data directly to the Internet.

In one or more embodiments, VPC 150 comprises VPC endpoint 152. VPC endpoint 152 serves as a funnel through which inbound and outbound data to and from VPC 150 flows. Thus, VPC endpoint 152 may restrict or prevent resource instances 158 from accessing the Internet or other public networks. In one or more embodiments, VPC endpoint 152 allows private connections between instances running within a private subnet and cloud resources 160 without requiring access over the Internet. A cloud resource that is connected to VPC 150 through a private connection is referred to herein as being "part of" or "within" the VPC environment even if the resource is external to the private subnet(s) defined by VPC 150. For instance, a storage bucket allocated from storage service 166 is within the VPC environment if connected to VPC 150 through VPC endpoint 152. This allows partners 110 and partner 120 to load data into storage buckets within the VPC environment without allowing them access to servers and other resource instances executing within private subnets in VPC 150.

VPC endpoint 152 may comprise route polices 154 and identity and access management (IAM) policies 156 to control what inbound and outbound data is permitted to and from the VPC environment. Route policies 154 restrict the network routes through which inbound and outbound requests may be sent and/or received. For instance, route policies 154 may include one or more route tables that define network prefixes and endpoints that correspond to permitted network routes. Messages to and from Internet gateways may be restricted to prevent resource instances 158 from sending sensitive data to an unauthorized partner or outside party. In order to access cloud resources 160, messages between resource instances 158 and cloud resources 160 may be routed such that they do not go through an Internet gateway but rather are routed through a private connection established between VPC endpoint 152 and an endpoint for the connected cloud resources. VPC endpoint 152 may restrict what data resource instances 158 may send and receive from cloud resources 160 to prevent resources instances 158 from using cloud resources 160 to export data.

IAM policies 156 define user permissions and roles that control access to services and data that is deployed within virtual cleanroom 140. IAM policies may be registered with or "attached" to specific users or groups of users (referred to as "security groups"). A "user" in this context may refer to a human user, an account, that is registered with VPC 150 and/or services therein, an application, a service, or some other resource. For instance, different IAM policies may be attached to a set of one or more software components deployed within VPC 150, one or more of cloud resources 160, partner 110, and partner 120. In one or more embodiments, an IAM policy may define the conditions under which (if any) data may be read, written, sent, and/or otherwise accessed by components/users deployed within the virtual cleanroom 140. An IAM policy may further define similar conditions for users that reside outside virtual cleanroom 140. In another example, an IAM policy may define which of cloud resources 160 a software instance executing in VPC 150A may access.

Cloud resources 160 comprise services and/or other resources that are provisioned from a public cloud environment and that are accessible to VPC 150. A cloud resource in this context may comprise software resources, hardware resources, and/or some combination thereof that is provided through a data communications network such as the Internet. Example cloud resources 160 include authentication service 162 to authenticate users requesting access to resources within virtual cleanroom 140, notification service 164 to push notifications to users of virtual cleanroom 140, storage service 166 to provide storage resources to users of virtual cleanroom 140, configuration service 168 to configure policies and other settings associated with virtual cleanroom 140, monitoring service 170 to collect and store log data, and data warehousing service 172 to analyze data.

Figure 2:
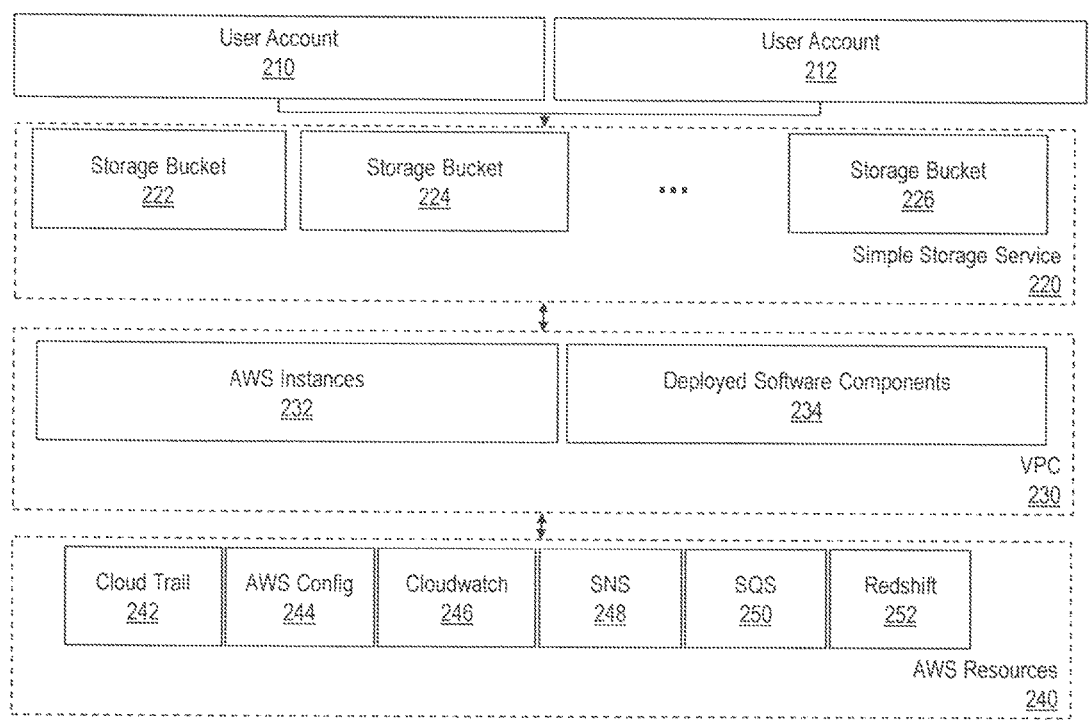
FIG. 2 illustrates an example system built using AWS components in accordance with one or more embodiments.

In one or more embodiments, cloud resources may be built using Amazon Web Services (AWS) components. Referring to FIG. 2, it depicts an example virtual cleanroom that is provisioned in part using AWS resources 240. Example AWS resources include Simple Storage Service (S3) 220 through which one or more S3 storage buckets may be allocated, Cloud Trail 242 to monitor and log application programming interface (API) calls, AWS Config 244 to manage configurations within the virtual cleanroom and to provide notification of any configuration changes, Cloudwatch 246 to collect and log metrics associated with application instances executing within the virtual cleanroom, Simple Notification Service (SNS) 248 to push notifications to users of the virtual cleanroom, Simple Queue Service (SQS) 250 to manage messages between different cloud resources, and Redshift 252 to perform data warehousing operations to facilitate analysis of data stored within the virtual cleanroom. Instances of these services may be logically isolated to one or more associated VPC(s). For example, VPC 230 may comprise AWS Instances 232 which are provisioned from public AWS resources 240. VPC 230 may further comprise deployed software components 234 which include one or more software files loaded through user account 210 and/or user account 212.

In one or more embodiments, a plurality of S3 storage buckets are provisioned through simple storage service 220, including storage bucket 222, storage bucket 224, and storage bucket 226. As described further below, data may be loaded into the virtual private cloud environment through S3 storage buckets. For example, user account 210 may load sensitive data into storage bucket 222, and user account 212 may load data into storage bucket 224. AWS instances 232 and/or deployed software components may have credentials that allow the resources to read the sensitive data from these storage buckets.

In one or more embodiments, VPC endpoints within VPC 230 control what types of calls from the cleanroom software components are able to reach the AWS endpoints (S3, SQS, SNS, etc.), including storage buckets 222, 224, and 226. The policy on the VPC Endpoint restricts what buckets components inside the cleanroom are able to access. Policies attached to the S3 bucket may allow data to be read from the bucket by components internal to VPC 230 but may be set to prevent access to raw data originating from outside the cleanroom. The policies may further prevent Access Control Lists (ACLs) to be set on objects that would provide anonymous access.

In one or more embodiments, AWS instances 232 and/or deployed software components 234 have access to read raw data from one or more storage buckets. These components may then operate on the raw data to generate an analytic output, which may be written to storage bucket 226. In one or more embodiments, polices may be defined to ensure that the output does not include any sensitive data before it is written to storage bucket 226. For example, the output may be parsed to determine whether it includes any sensitive data before it is written. If sensitive data is detected within the output, then the sensitive data may be automatically deleted from the output or the output may be prevented from being written to storage bucket 226.

Although FIG. 2 depicts an example system that uses AWS, in other embodiments a VPC may be provisioned using another set of cloud computing services. Services that provide functionality similar to the services described above may have different names and come from different providers, depending on the particular implementation.

3. Virtual Cleanroom Setup and Use

Figure 3:
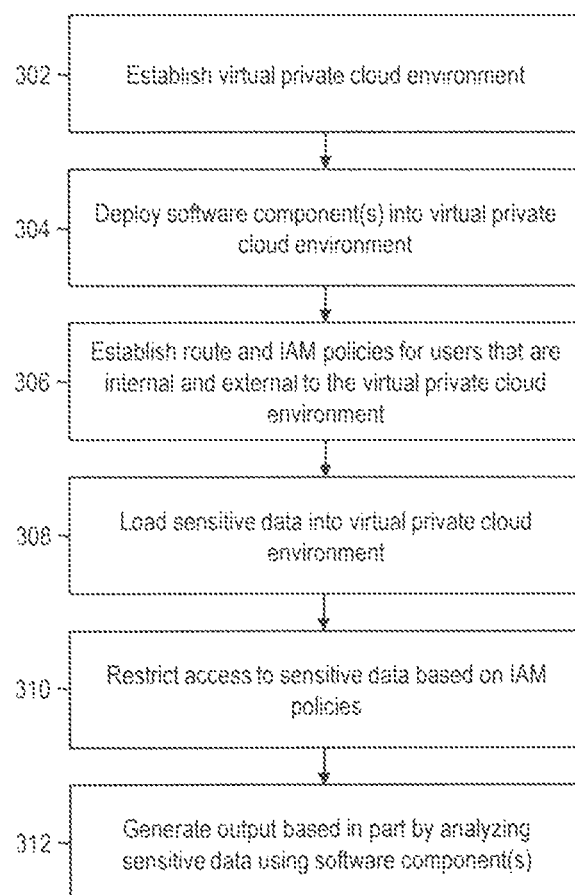
FIG. 3 illustrates an example set of operations for setting up and running a virtual cleanroom data processing environment in accordance with one or more embodiments.

FIG. 3 illustrates an example set of operations for setting up and running a virtual cleanroom data processing environment in accordance with one or more embodiments. At block 302, one or more processes establish a VPC environment. The manner in which a VPC environment is created and configured may vary depending on the particular implementation. As previously mentioned, virtual cleanroom 140 may be built using one or more cloud service components. In the context of AWS components, for example, partner 110 may create an AWS account that is initially owned and controlled by them. Once created, partner 110 may use one or more AWS components to establish VPC 150, which may include creating VPC endpoint 152 and establishing a set of one or more private subnets on which resource instances may be deployed.

At block 304, a set of one or more software components is deployed into the VPC environment. For example, partner 110 may load deployment data 114 and invoke one or more cloud services such that the loaded deployment data is used install and configure the set of one or more software components. Once deployed, the one or more software components execute within one or more private subnets associated with VPC 150. The software components that are deployed within virtual cleanroom by partner 110 may vary from implementation to implementation. In one or more embodiments, the software components deployed by partner 110 comprise analytic software to execute analysis on sensitive raw/user data provided by partner 120. Example analytic tools may include, without limitation, campaign analysis, forecasting, data mining, benchmarking, prescriptive analytics, and/or other tools that extract insight from or transform the raw data into an output that is more meaningful and useful to a target user.

At block 306, route and IAM policies are established for users that are both internal and external to the VPC environment. The route policies may restrict the network routes that certain buckets of data are permitted to travel. For instance, certain buckets of data may be prohibited from being sent through a public Internet gateway. Defining an IAM policy may comprise assigning IAM roles and/or credentials and storing policy information within VPC endpoint 152. IAM roles and policies may attach to individual users or groups of users to control inbound and outbound user access to services and data within virtual cleanroom 140. In one or more embodiments, IAM policies are defined for partner 110, 120, and resource instances 130.

At block 308, the one or more processes load sensitive user data provided by partner 120 into the VPC environment. The data that is loaded into the VPC environment may vary from implementation to implementation. In the context where campaign analysis software has been deployed into VPC 150, for example, the sensitive data that is loaded may comprise consumer information collected by partner 120 from their consumers. In the context of forecasting or other business intelligence analytics, the raw user data may comprise sales information or similar sensitive data. In one or more embodiments, the raw data that is loaded into the environment is encrypted and stored within one or more storage buckets. The encryption key is provided to the software instances executing in VPC 150 that have access privileges to the data and may or may not be provided to partner 120. However, the encryption key is not provided to partner 110.

In one or more embodiments, partner 110 may also provide raw data at block 308. This scenario may occur where partner 110 and 120 agree to combine datasets for the analysis. Similar to the raw data provided by partner 120, the raw data provided by partner 110 may be stored in the same or a separate storage bucket. The data may be encrypted, and the encryption key provided to software executing in the VPC environment. This allows the software to analyze the combined datasets without revealing the contents of one partner's dataset to another partner.

In one or more embodiments, a shared secret (herein referred to as a "study secret") is created by partner 110 and securely shared with partner 120. A study secret may be a key or some other piece of data that de-identifies the raw data before it is loaded into the cleanroom environment. For example, in a study that analyzes demographic information and trends, partner 110 and partner 120 may wish to share data without revealing certain information about their consumers to the other partner. The study secret may be used to de-identify the consumer information such that the other partner is not able to match behavioral information described in the raw data with an individual consumer. The study secret allows for de-identified datasets to be correlated as though they still had the identifying information. The study secret may be unique to each study or set of related data to be analyzed and may be prevented from entering the virtual cleanroom. This process allows for de-identified datasets from each partner to be linked within a study group, while preventing two data sets de-identified into different studies from being linked together.

At block 310, the one or more processes restrict access to sensitive data based on the route and IAM policies. In one or more embodiments, the process checks inbound and outbound requests against route policies 154 and IAM policies to determine whether the request is permitted. If a route or IAM policy is violated, then the process prevents access to the requested resource. As discussed further herein, the IAM policies may be established to lock down virtual cleanroom 140 such that partner 110 does not have access to sensitive information loaded into the environment by partner 120, and partner 120 does not have access to sensitive information loaded into the environment by partner 110.

At block 312, the one or more processes generate an output based, at least in part, by analyzing the sensitive data using one or more of the software components deployed into the VPC environment by partner 110. For example, a forecasting model may load and analyze a raw set of time-series data to generate predictions about future events. As another example, a campaign analysis may load and analyze sensitive consumer information to determine the effects of a marketing campaign on consumer behavior. The output that is generated at this step depends on the software and raw data that is loaded into the VPC environment by partner 110 and 120, respectively. In the context of campaign analysis, for example, the output may include, without limitation:

Quality control checks on the raw data including reached versus control distribution comparisons for different demographics, reached versus control pre period time series spend data, etc.;

A copy of metadata that partner 120 provided to describe the campaign (start, stop dates, high level counts, etc.);

Return on Investment (ROI) estimates for the total campaign and subsets of the campaign's reached audience;

Model and algorithmic performance data informing analysts as to whether the conclusions are methodologically valid; and/or Counts indicating impression and household distribution amongst different demographics (e.g., 100,000 households had children, 500,000 impressions went to households with income over 100,000, etc.)

In some cases, data provided by different partners may be matched to generate an analytic output. For instance, demographic information for consumer data collected from different partners may be compared and match to aggregate statistics from the different data sets. Other attributes may also be matched from different partner data sets to generate an analytic output. Once generated, the output is delivered to a location that is accessible to one or more of partners 110 and 120.

In one or more embodiments, sensitive data is not included within the output data that is generated. For example, the raw data may include specific customer names and other data that is strictly confidential. The campaign analytic outputs summarized above may be generated such that such sensitive information is not included in the final report that is generated. In addition or alternatively, output data may be restricted to delivery endpoint 128 to prevent partner 110 from gaining unauthorized access to sensitive information. Partner 120 may review the output data and remove sensitive data, if any, before sharing output data with partner 110.

In one or more embodiments, when the virtual cleanroom is provisioned from AWS, SQS may be used by the individual components in the cleanroom to pass simple messages to each other to control the workflow of generating an analytic output. For example, an SQS message may be sent from one component to another to request a particular process or task be performed, to indicate that a task has been completed, etc.

In one or more embodiments, the virtual cleanroom may be configured with two automated routes through which control messages may enter and leave. For example, the routes may be implemented as SNS topics which travel through a VPC endpoint to and/or from an SNS endpoint. The routes may be configured to allow one or more partners/ user accounts to receive a copy of every control message entering and leaving the cleanroom.

4. Access Control and Prevention

As previously mentioned, virtual cleanroom 140 uses IAM policies to restrict inbound and outbound data accesses. To protect sensitive data that has been loaded into virtual cleanroom 140, IAM roles may be assigned to different components within the VPC environment. For instance, an IAM role may be defined such that the software components running within a VPC environment are not allowed to access any resource sufficient to send the raw user data provided by partner 120 outside of VPC environment without prior approval of the first user. If the software attempts to send data outside of the VPC environment, VPC endpoint receives the outbound message and stops it from getting to an Internet gateway. Thus, even if malicious code has been deployed, either intentionally or inadvertently, by partner 110 into VPC 150, the malicious code is prevented from compromising the data by sending the data outside of the virtual cleanroom environment.

Figure 4:
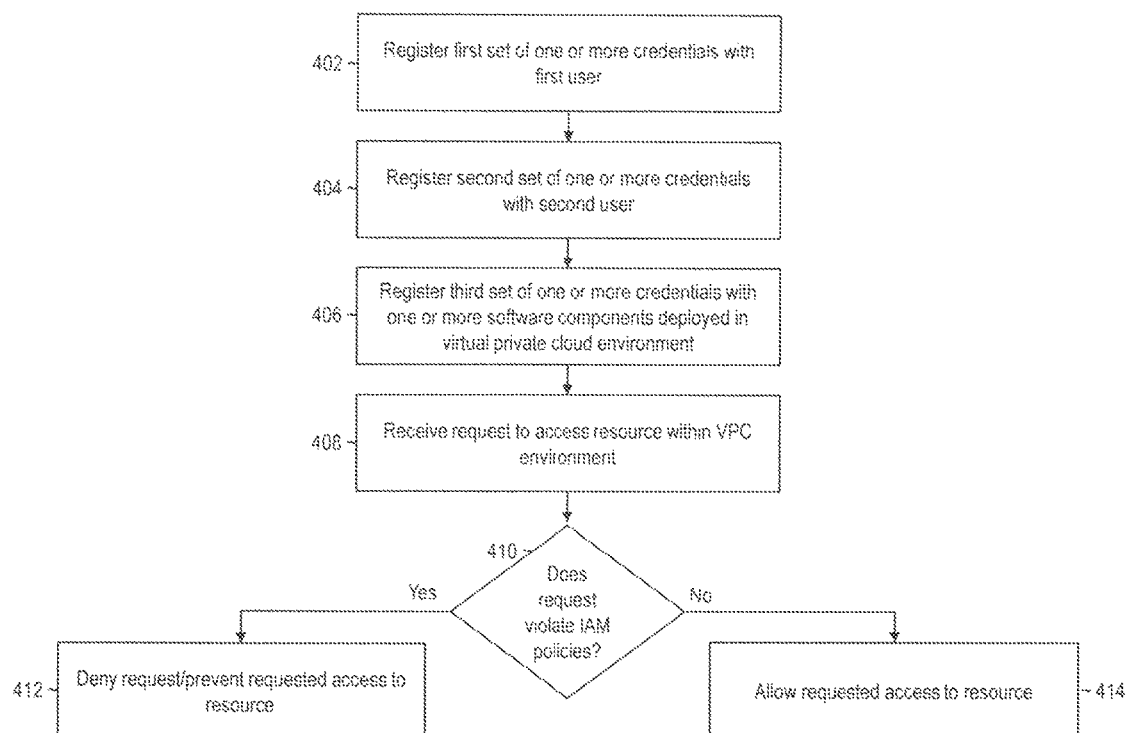
FIG. 4 illustrates an example set of operations for registering credentials to lock down a virtual cleanroom in accordance with one or more embodiments.

At various stages, security credentials may be generated or otherwise provided to various users based on the IAM policies/roles that are attached to the user. FIG. 4 illustrates an example set of operations for registering credentials to lock down a virtual cleanroom in accordance with one or more embodiments. At block 402, a first set of one or more credentials is registered with a first user, such as an account controlled by partner 110. The first user may use the first set of credentials to access a limited set of resources. For instance, the first user may be permitted to deploy software updates, such as patches or additional software, within virtual cloud. The software updates that are deployed are not allowed to send data outside of the VPC environment thereby protecting the data from unauthorized human access as a result of the update.

In one or more embodiments, the first set of one or more credentials does not allow partner 110 to read out any data from virtual cleanroom environment 140. In other embodiments, the first set of one or more credentials may allow partner 110 to read out a limited set of data, such as audit logs, from virtual cleanroom 140. However, the first set of one or more credentials may not be used to read out raw data loaded into virtual cleanroom environment 140 by partner 120.

At block 404, a second set of one or more credentials registered with a second user. The second set of security credentials allow the second user (e.g., an account controlled by partner 120) to load raw data into the VPC environment. In one or more embodiments, the second set of one or more credentials does not allow the second user to read out the raw data. Thus, once loaded into the VPC environment, the raw data is rendered inaccessible to users outside of the environment. In other words, IAM roles and credentials may be established such that the raw data never leaves the virtual cleanroom environment. As there are no human users within the environment, human access to the raw data may be prohibited even if the second set of security credentials is compromised. In other embodiments, the second set of security credentials may allow the second user to read raw data that they loaded into the virtual cleanroom.

In one or more embodiments, the second set of one or more security credentials does not allow read access to data loaded into the VPC environment by the first user. For example, the second set of security credentials may prevent partner 120 from reading raw data and/or deployment data such as software configuration files, source code, and executables.

In one or more embodiments, the first set of security credentials and/or the second set of security credentials grant read access to the output data generated by the software executing on the raw data loaded into the VPC environment. Thus, both partners may be provided with access to the final output without compromising the underlying data that was used/combined to generate the output. In other word, partner 110 may view the report without having any access to raw data 124 that is loaded by partner 120 into VPC 150. Similarly, partner 120 may view the report without having access to deployment data 114. In other cases, a single partner may have read access to the output data. This gives the partner providing the raw data (e.g., partner 120) a chance to review the output data before sharing it with the other partner to ensure that none of the raw data used to generate the output will be compromised upon sharing the report.

At block 406, a third set of one or more credentials is registered with one or more software components deployed in the VPC environment. The third set of one or more security credentials allow at least one of the one or more software components to read raw user data written to the VPC environment by the first and/or second user. Thus, the at least one software component may use the security credentials to read the user data and generate an output based, at least in part, on the raw data. However, the third set of one or more security credentials does not allow the one or more software components to access any resources sufficient to send the user data outside of the VPC environment without approval of user that loaded the sensitive data. In one or more embodiments, approval is not an option. In other words, the one or more software components may be prevented from ever sending the user data outside of the VPC environment.

At block 408, VPC endpoint 152 receives a request to access a resource within the VPC environment. For example, the request may be to read data from a storage bucket, write data to a storage bucket, invoke a particular cloud service, etc.

At block 410, it is determined whether the request violates the route and IAM policies defined by VPC endpoint 152. One or more processes may examine the credentials associated with the request to determine the user, such as the software component or user account, that generated the request and the access privileges granted to the originating user. If the request violates a route or IAM policy, then it is denied at block 412. Otherwise, the requested access is allowed at block 414.

5. Shared Multi-Factor Authentication

In order to perform the initial integration with a partner, it may be useful to have limited human access into virtual cleanroom 140 to troubleshoot issues with the data. While simple formatting errors in the data can be automatically handled and reported, more subtle errors in how the data is represented may benefit from analyst interpretation.

In one or more embodiments, a set of one or more human access privileges are protected using shared multi-factor authentication. With multi-factor authentication, partner 110 and partner 120 each control one or more separate authentication factors. Human access privileges may be restricted unless both the authentication factor or factors held by both parties are received.

In one or more embodiments, human access privileges are reserved for an administrator account. The administrator account is locked down as part of establishing the virtual cleanroom environment. In order to lock down the administrator account, partner 110 may hold a first authentication factor (e.g., a password), and partner 120 may hold a second authentication factor (e.g., MFA device 126). Since partner 110 holds the account password and partner 120 has the MFA device, access to the account is restricted unless both parties cooperate Partner 110 enters the password privately so that it remains unknown to partner 120. Partner 120 provides a time-limited authentication token, which expires after a threshold time period and is created via the MFA device. These two coordinated actions allow an administrative session to be started. With the administrative account locked until both partners are authenticated, no single partner is able to use the administrator credentials and access services reserved for the administrative account without involving the other.

When human access is desired, a shared MFA administrator session is started to create a jumpbox server in a public subnet within virtual cleanroom 140. When the jumpbox server is created inbound access to it is restricted to a single IP assigned to a machine physically controlled by partner 120, represented by jumpbox client 128. Analysts use the partner machine/jumpbox client 128 to logon to the jumpbox server. Once on the jumpbox server, analysts may logon to the servers inside the private subnet. All access during the human access session is audited using logging services deployed within the virtual cleanroom environment (described below) in addition to any audit logging the partner wishes to install on jumpbox client 128. When the administrator session has ended, the jumpbox server may be terminated, preventing any additional access into the environment. While the jumpbox server allows remote login from the partner's machine, it does not allow outbound internet access.

6. Virtual Cleanroom Monitoring

During human access into the virtual cleanroom, monitoring services may be executed continuously and concurrently to track function calls and data are in place and can be reviewed by the partner 110 and partner 120. In the case that an IAM access key and secret is compromised out of the cleanroom, storage bucket policies may prevent data from being read since any request using the IAM access key would not be originating from VPC endpoint 152.

As previously mentioned, partner 120 may install additional monitoring, such as keystroke level monitoring, on their access box that is executing jumpbox client 128. In addition or alternatively, partner 120 may provide physical security such as security guards to ensure that no data leaves their building. Policies such as restricting personal electronic devices may add another layer of protection when an analyst associated with partner 110 is onsite during a human access session.

In the context of AWS components, one or more of the following services may provide monitoring within the virtual cleanroom environment:

AWS Config: Config reports any changes in the setup of the cleanroom environment (additions/removals of EC2 servers, modification of VPC subnets, etc.). Changes are sent to an SNS topic as well as being stored in the system logging bucket.

AWS CloudTrail: CloudTrail reports all AWS API calls. Calls are sent to an SNS topic as well as being stored in the system logging bucket.

AWS CloudWatch: CloudWatch allows metrics about how different AWS services are being used (sizes of queues, network throughput, CPU usage, etc.) to be reported and viewed by both parties using either the AWS web console or the AWS API.

AWS S3 Audit Logging: S3 audit logging records every access to data stored on S3. This information includes the requester and originating request address, the object being accessed and the time and response code of the access.

AWS Redshift Audit Logging Redshift audit loggings keep track of every component using a Redshift cluster as well as every SQL query that is executed. These logs are stored in the system-logs bucket.

7. Kill Switch Protection

In one or more embodiments, a kill switch is provided to protect sensitive data in the event of a potential breach. A "kill switch" as used herein refers to a software component that destroys the virtual cleanroom environment. The kill switch may be configured to allow one or more partners/user accounts to unilaterally cause all sensitive data to be erased from the virtual private cloud environment. If the kill switch is triggered, then sensitive data for both the partner invoking the kill switch as well as sensitive data loaded into the cleanroom by other partners is erased.

The kill switch may be used in conjunction with the continuous monitoring and auditing of calls as previously described to provide an extra layer of protection to sensitive data that has been loaded into the virtual cleanroom. If a call appears to be suspicious or is unauthorized, the kill switch may be automatically or manually invoked to destroy the environment. By triggering the kill switch, any unauthorized access to the virtual cleanroom may be immediately terminated, thereby mitigating the potential damages caused by a breach.

Figure 5:
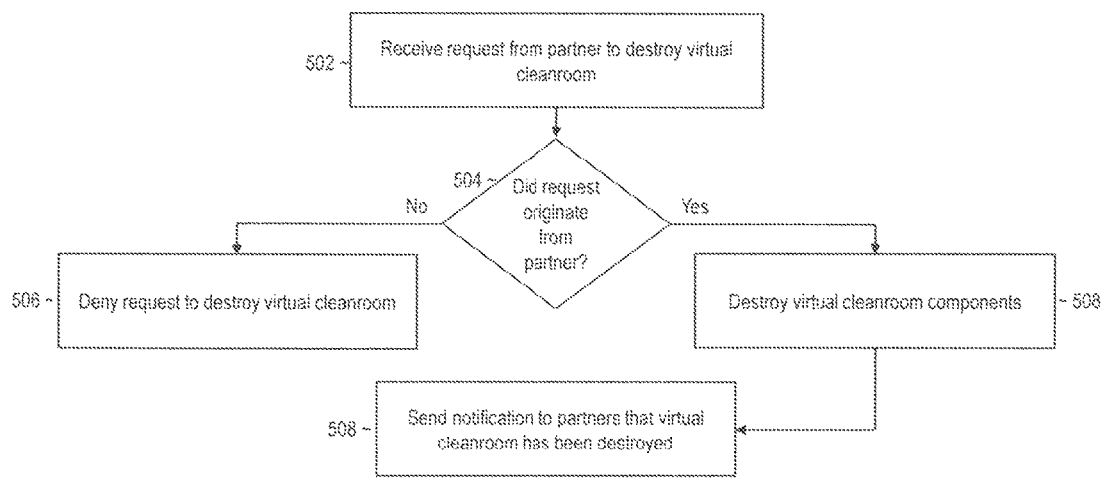
FIG. 5 illustrates an example set of operations for managing kill switch protections in accordance with one or more embodiments.

FIG. 5 illustrates an example set of operations for managing kill switch protections in accordance with one or more embodiments. At block 502, a request is received from a user account to destroy a virtual cleanroom. In one or more embodiments, either partner 110 or partner 120 may invoke the kill switch independently. The kill switch can be invoked by authorized user accounts by sending an authenticated message to an SNS topic. The message can be sent from a script, a SMS message, or some other application.

At block 504, it is determined whether the request originated from an authorized partner. If the request did not originate from an authorized party, then the process continues to block 506, and the request is denied. Otherwise the process continues to block 508. In some embodiments, a confirmation request may be sent to the requesting party to confirm the request. This may be done to prevent accidental destruction of the virtual cleanroom environment.

At block 508, a set of virtual cleanroom components is destroyed. In the context where AWS components are used, the kill switch may delete one or more components including without limitation:
  Elastic Cloud Compute (EC2) Servers
  Raw data S3 buckets
  All AWS Virtual Private Network (VPC) components:
  Subnets
  Routes
  Security Groups
  SNS topics and SQS queues In one or more embodiments, invoking the kill switch destroys the software components and raw data loaded into the virtual cleanroom environment through one or more user accounts.

In one or more embodiments, the kill switch deletes all data within the virtual cleanroom environment except the system and application logging bucket. In other words, while the kill switch destroys the raw data and software components within the virtual cleanroom environment, the audit logs that track historical calls and data accesses within the data environment are preserved. By maintaining the logs, partner 110 and/or 120 may determine the extent of the breach.

At block 508, a notification is sent to the partners that the virtual cleanroom has been destroyed. The notification may be posted to a registered account, sent to an email address or delivered in any other way as specified by the partners. The notification may include one or more logs to give a picture of the events leading to the kill switch being triggered.

After the security incident is resolved, a new virtual cleanroom may be instantiated using one or more scripts and a shared MFA administrator session. For example, the administrator session may be used to reestablish the components listed above such as the EC2 servers, S3 buckets, VPC endpoints and other components, subnets, routes, security groups, etc. The raw data and software components may be reloaded into the new instance of the virtual private cloud environment through the user accounts of each respective partner.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   configuring a virtual private cloud environment to prevent data from being sent to network locations external to the virtual private cloud environment;
   receiving, by one or more computing resources deployed within the virtual private cloud environment through a first user account that is associated with the virtual private cloud environment, a first set of data;

deploying a set of one or more software components within the virtual private cloud environment, the set of one or more software components received from a second user account that is associated with the virtual private cloud environment;

wherein the first user account is associated with a first authentication token and the second user account is associated with a second authentication token;

generating, by the set of one or more software components deployed within the virtual private cloud environment based at least in part on the first set of data that is associated with the first user account, a set of output data;

continuously while the first set of data is stored in the virtual private cloud environment and unless the first user account authorizes export of the first set of data, preventing the first set of data from being sent to network locations external to the virtual private cloud environment; and preventing access to resources within the virtual private cloud environment by network devices external to the virtual private cloud environment unless both the first user account and the second user account have been authenticated based, at least in part, on the first authentication token and the second authentication token.

2. The method of claim 1,
wherein the virtual private cloud environment includes a virtual private cloud endpoint;
wherein all outbound data from the virtual private cloud environment to sources external to the virtual private cloud environment are routed through the virtual private cloud endpoint.

3. The method of claim 2, wherein the virtual private cloud endpoint disables access by the set of one or more software components to network locations external to the virtual private cloud environment.

4. The method of claim 1, further comprising:
generating an administrator session in response to receiving the first authentication token and the second authentication token; and
wherein during the administrator session access is restricted to a single internet protocol address and outbound access to the first set of data is prevented.

5. The method of claim 1, further comprising:
storing a set of one or more policies that control access to a set of policies that control access to resources in the virtual private cloud environment; and
preventing changes to the set of one or more policies unless both the first user account and the second user account have been authenticated.

6. The method of claim 1, further comprising
registering a first set of one or more security credentials for the first user account;
wherein the first set of one or more security credentials allows the first user account to store the first set of data in the virtual private cloud environment;
registering a second set of one or more security credentials for the second user account;
wherein the second set of one or more security credentials does not allow access to the first set of data that is stored in the virtual private cloud environment;
registering a third set of one or more security credentials for the set of one or more software components deployed within the virtual private cloud environment; and
wherein the third set of one or more security credentials provides at least one software component of the set of one or more software components with access to read the first set of data that is stored within the virtual private cloud environment and does not allow the one or more software components to access any resources sufficient to send the first set of data outside of the virtual private cloud environment without prior approval of at least the first user account.

7. The method of claim 6, further comprising:
maintaining audit logs that track accesses to data stored within the virtual private cloud environment;
wherein both the first and second set of security credentials are restricted from accessing the audit logs at rest; and
wherein an administrator access session is initiated to copy a requested set of audit logs to a first location;
wherein the second set of security credentials allow the second user account to read the audit logs in the first location and allow the second user account to approve and copy the audit logs to a second location;
wherein the first set of one or more security credentials allow the first user account to read the audit logs from the second location.

8. The method of claim 1, further comprising:
providing the set of output data to at least one network location outside of the virtual private cloud environment; and
wherein the first set of data is not included in the set of output data.

9. The method of claim 1, further comprising generating a set of log data that tracks all accesses to resources within the virtual private cloud environment by devices external to the virtual private cloud environment.

10. One or more non-transitory computer readable media storing instructions, which, when executed by one or more hardware processors, cause operations comprising:
configuring a virtual private cloud environment to prevent data from being sent to network locations external to the virtual private cloud environment;
receiving, by one or more computing resources deployed within the virtual private cloud environment through a first user account that is associated with the virtual private cloud environment, a first set of data;
deploying a set of one or more software components within the virtual private cloud environment, the set of one or more software components received from a second user account that is associated with the virtual private cloud environment;
wherein the first user account is associated with a first authentication token and the second user account is associated with a second authentication token;
generating, by the set of one or more software components deployed within the virtual private cloud environment based at least in part on the first set of data that is associated with the first user account, a set of output data;
continuously while the first set of data is stored in the virtual private cloud environment and unless the first user account authorizes export of the first set of data, preventing the first set of data from being sent to network locations external to the virtual private cloud environment; and
preventing access to resources within the virtual private cloud environment by network devices external to the virtual private cloud environment unless both the first user account and the second user account have been authenticated based, at least in part, on the first authentication token and the second authentication token.

11. The one or more non-transitory computer readable media of claim 10,
wherein the virtual private cloud environment includes a virtual private cloud endpoint;
wherein all outbound data from the virtual private cloud environment to sources external to the virtual private cloud environment are routed through the virtual private cloud endpoint.

12. The one or more non-transitory computer readable media of claim 11, wherein the virtual private cloud endpoint disables access by the set of one or more software components to network locations external to the virtual private cloud environment.

13. The one or more non-transitory computer readable media of claim 10, the instructions further causing operations comprising:
generating an administrator session in response to receiving the first authentication token and the second authentication token; and
wherein during the administrator session access is restricted to a single internet protocol address and outbound access to the first set of data is prevented.

14. The one or more non-transitory computer readable media of claim 10, the instructions further causing operations comprising:
storing a set of one or more policies that control access to a set of policies that control access to resources in the virtual private cloud environment; and
preventing changes to the set of one or more policies unless both the first user account and the second user account have been authenticated.

15. The one or more non-transitory computer readable media of claim 10, the instructions further causing operations comprising:
registering a first set of one or more security credentials for the first user account;
wherein the first set of one or more security credentials allows the first user account to store the first set of data in the virtual private cloud environment;
registering a second set of one or more security credentials for the second user account;
wherein the second set of one or more security credentials does not allow access to the first set of data that is stored in the virtual private cloud environment;
registering a third set of one or more security credentials for the set of one or more software components deployed within the virtual private cloud environment; and
wherein the third set of one or more security credentials provides at least one software component of the set of one or more software components with access to read the first set of data that is stored within the virtual private cloud environment and does not allow the one or more software components to access any resources sufficient to send the first set of data outside of the virtual private cloud environment without prior approval of at least the first user account.

16. The one or more non-transitory computer readable media of claim 15, the instructions further causing operations comprising:
maintaining audit logs that track accesses to data stored within the virtual private cloud environment;
wherein both the first and second set of security credentials are restricted from accessing the audit logs at rest; and
wherein an administrator access session is initiated to copy a requested set of audit logs to a first location;
wherein the second set of security credentials allow the second user account to read the audit logs in the first location and allow the second user account to approve and copy the audit logs to a second location;
wherein the first set of one or more security credentials allow the first user account to read the audit logs from the second location.

17. The one or more non-transitory computer readable media of claim 10, the instructions further causing operations comprising:
providing the set of output data to at least one network location outside of the virtual private cloud environment; and
wherein the first set of data is not included in the set of output data.

18. The one or more non-transitory computer readable media of claim 10, the instructions further causing operations comprising generating a set of log data that tracks all accesses to resources within the virtual private cloud environment by devices external to the virtual private cloud environment.

19. A system comprising:
one or more hardware processors;
one or more non-transitory computer readable media storing instructions, which, when executed by the one or more hardware processors, cause operations comprising:
configuring a virtual private cloud environment to prevent data from being sent to network locations external to the virtual private cloud environment;
receiving, by one or more computing resources deployed within the virtual private cloud environment through a first user account that is associated with the virtual private cloud environment, a first set of data;
deploying a set of one or more software components within the virtual private cloud environment, the set of one or more software components received from a second user account that is associated with the virtual private cloud environment;
wherein the first user account is associated with a first authentication token and the second user account is associated with a second authentication token;
generating, by the set of one or more software components deployed within the virtual private cloud environment based at least in part on the first set of data that is associated with the first user account, a set of output data;
continuously while the first set of data is stored in the virtual private cloud environment and unless the first user account authorizes export of the first set of data, preventing the first set of data from being sent to network locations external to the virtual private cloud environment; and
preventing access to resources within the virtual private cloud environment by network devices external to the virtual private cloud environment unless both the first user account and the second user account have been authenticated based, at least in part, on the first authentication token and the second authentication token.

20. The system of claim 19,
wherein the virtual private cloud environment includes a virtual private cloud endpoint;

wherein all outbound data from the virtual private cloud environment to sources external to the virtual private cloud environment are routed through the virtual private cloud endpoint.

* * * * *